E. W. WINANS AND A. J. KINNUCAN.
WRIST PIN LOCK.
APPLICATION FILED OCT. 4, 1918.
1,321,349.
Patented Nov. 11, 1919.
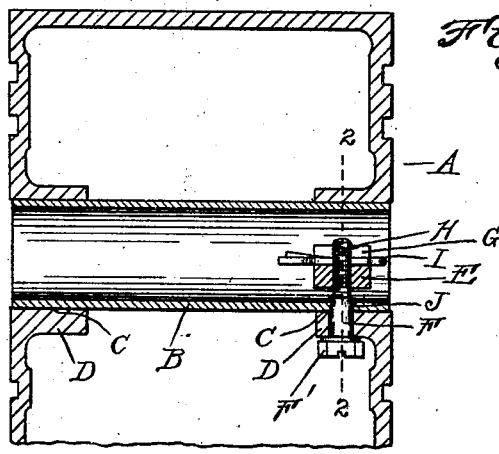
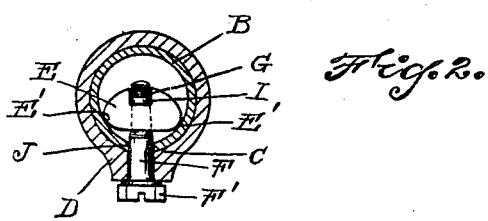
Inventors
Earl W. Winans
and
Alfred J. Kinnucan

UNITED STATES PATENT OFFICE.

EARL W. WINANS AND ALFRED J. KINNUCAN, OF DETROIT, MICHIGAN.

WRIST-PIN LOCK.

1,321,349.     Specification of Letters Patent.     Patented Nov. 11, 1919.

Application filed October 4, 1918. Serial No. 256,786.

*To all whom it may concern:*

Be it known that we, EARL W. WINANS and ALFRED J. KINNUCAN, citizens of the United States of America, residing at Detroit, in the county of Wayne and State of Michigan, have invented certain new and useful Improvements in Wrist-Pin Locks, of which the following is a specification, reference being had therein to the accompanying drawings.

The invention relates to pistons and refers more particularly to the means for locking the wrist pin to the piston. Heretofore, various wrist pin locking devices have been used, but they have been found unsatisfactory inasmuch as they worked loose under the continuous vibrations to which they were subjected and permitted wear between the wrist pin and piston with the consequent play and furthermore scored the cylinder wall in many instances. One of these locking devices comprises a cotter pin inserted within a hollow wrist pin and through an aperture in the inner end of a bolt which extends through a boss on the piston and into the wrist pin. In this locking device there is a big tendency for the cotter pin to shear off, which will result in the above objectionable features.

Our invention overcomes these objections and further has for an object the provision of a simple effective construction, which can be readily manufactured and assembled. Other objects of the invention reside in the novel arrangements and combinations of parts as more fully hereinafter set forth.

In the drawings:

Figure 1 is a central longitudinal section through the piston, to which our invention is applied;

Fig. 2 is a cross-section on the line 2—2 of Fig. 1.

A is the piston, and B the wrist pin for connecting the piston to the connecting rod (not shown). The wrist pin extends across the piston and engages the bearings C, preferably formed by the bosses D on the inner wall of the piston. For locking the wrist pin to the piston there is provided the lock nut E within the wrist pin and threadedly engaging the inner end of the bolt F. This bolt passes through registering holes in the lower walls of the boss D and wrist pin B and has the head F' resting against the boss. The nut E is preferably formed of half round stock and has its opposite edges E' rounded to provide more extended bearing surfaces upon the inner wall of the wrist pin. The nut has suitably alined apertures in its upper edge, such as the slots G with which one of the transverse holes H in the inner end of the bolt are adapted to be registered for the passage of the cotter pin I.

For the purpose of securing a tight fit between the wall of the aperture in the wrist pin and the bolt, the latter has the slightly inclined shouldered portion J, which is adapted to be wedged against the wall of the aperture, the arrangement being such that the head F' of the bolt will seat upon the boss D.

It will be readily seen from the above description that the nut E upon the inner end of the bolt F can be tightly clamped against the inner wall of the wrist pin B so that the wrist pin is clamped against its bearing and has no vertical movement relative thereto. This further assists in preventing any relative rotation of the wrist pin and piston. Moreover, the nut is locked from rotation upon the bolt F by the cotter pin I, which latter is not subjected to any shearing stresses.

What we claim as our invention is:

1. The combination with a piston, of a hollow wrist pin extending across said piston and engaging bearings therein, a bolt extending through one of the bearings and said wrist pin, and a nut within said wrist pin and upon said bolt, said nut clamped against the inner wall of said wrist pin.

2. The combination with a piston, of a hollow wrist pin extending across said piston and engaging bearings therein, a bolt extending through one of the bearings and said wrist pin, a nut within said wrist pin and threadedly engaging said bolt, said nut clamped against the inner wall of said wrist pin, and means for locking said nut from rotation upon said bolt.

3. The combination with a piston having diametrically opposite bosses on its inner wall, of a hollow wrist pin extending across said piston and engaging bearings in said bosses, a bolt extending through one of said bosses and said wrist pin, a nut within said wrist pin and threadedly engaging said bolt, said nut clamped against the inner wall of said wrist pin and provided with alined apertures in its upper edge, and a cotter pin extending through said alined apertures and through said bolt.

4. The combination with a piston having diametrically opposite bosses on its inner wall, of a hollow wrist pin extending across said piston and engaging bearings in said bosses, a bolt extending through the lower wall of one of said bosses and into said wrist pin, said bolt having an inclined shouldered portion engaging said wrist pin, a nut within said wrist pin and threadedly engaging said bolt, said nut having its outer edges clamped against the inner wall of said wrist pin and provided with alined slots in their upper edges, and cotter pins passing through said alined slots and through said bolt.

In testimony whereof we affix our signatures.

EARL W. WINANS.
ALFRED J. KINNUCAN.

Copies of this patent may be obtained for five cents each, by addressing the "Commissioner of Patents, Washington, D. C."